United States Patent
Wei et al.

(10) Patent No.: US 11,863,909 B2
(45) Date of Patent: Jan. 2, 2024

(54) REARVIEW MIRROR SYSTEM AND DISPLAY WITH ENHANCED FUNCTIONALITY FOR LOW-LIGHT CONDITIONS AND VEHICLE INCLUDING THE SAME

(71) Applicant: TRIPLE WIN TECHNOLOGY(SHENZHEN) CO.LTD., Shenzhen (CN)

(72) Inventors: Hui-Zhi Wei, Jincheng (CN); Jian-Long Xu, Jincheng (CN)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 0 days.

(21) Appl. No.: 17/747,152

(22) Filed: May 18, 2022

(65) Prior Publication Data
US 2023/0039412 A1    Feb. 9, 2023

(30) Foreign Application Priority Data

Aug. 3, 2021   (CN) .......................... 202110885233.4

(51) Int. Cl.
*H04N 7/18*      (2006.01)
*H04N 5/225*     (2006.01)
(Continued)

(52) U.S. Cl.
CPC .............. *H04N 7/183* (2013.01); *B60R 1/06* (2013.01); *B60R 1/1207* (2013.01); *H04N 7/188* (2013.01);
(Continued)

(58) Field of Classification Search
CPC ........ H04N 7/183; H04N 7/188; H04N 23/51; H04N 23/56; H04N 23/71; H04N 23/74;
(Continued)

(56) References Cited

U.S. PATENT DOCUMENTS

| | | | |
|---|---|---|---|
| 2003/0016125 A1* | 1/2003 | Lang | B60R 1/1207 348/148 |
| 2009/0085729 A1* | 4/2009 | Nakamura | B60Q 1/2665 340/425.5 |
| 2011/0074958 A1* | 3/2011 | Pastrick | B60R 1/006 348/148 |

FOREIGN PATENT DOCUMENTS

CN          110789455 A         2/2020

* cited by examiner

*Primary Examiner* — Howard D Brown, Jr.
*Assistant Examiner* — Tyler B Edwards
(74) *Attorney, Agent, or Firm* — ScienBiziP, P.C.

(57) ABSTRACT

A rearview mirror system for a vehicle providing a direct reflection of scenes in good light and an enhanced display of scenes in bad lighting includes a housing defining an opening, a display screen arranged at the opening, a camera, a fill light lamp, and a controller. The display screen is light-pervious at only one side. The camera and the fill light lamp are arranged on the housing. An image processing chip and the controller are arranged between the display screen and the housing. When ambient brightness is below a preset brightness value, the camera and the fill light lamp are activated, the camera captures images of side and rear scenes of the vehicle and generates an optical signal, the image processing chip, based on the optical signal, outputs an enhanced image on the display screen for better driving safety. A vehicle including the rearview mirror system is also disclosed.

20 Claims, 3 Drawing Sheets

(51) Int. Cl.
  *H04N 5/232* (2006.01)
  *B60R 1/06* (2006.01)
  *B60R 1/12* (2006.01)
  *H04N 23/51* (2023.01)
  *H04N 23/56* (2023.01)
  *H04N 23/71* (2023.01)
  *H04N 23/74* (2023.01)

(52) U.S. Cl.
  CPC ............. *H04N 23/51* (2023.01); *H04N 23/56* (2023.01); *H04N 23/71* (2023.01); *H04N 23/74* (2023.01); *B60R 2001/1215* (2013.01); *B60R 2001/1253* (2013.01)

(58) Field of Classification Search
  CPC ........ H04N 23/57; B60R 1/06; B60R 1/1207; B60R 2001/1215; B60R 2001/1253; B60R 2300/8026; B60R 1/26; B60R 1/12; Y02B 20/40
  See application file for complete search history.

REARVIEW MIRROR SYSTEM AND DISPLAY WITH ENHANCED FUNCTIONALITY FOR LOW-LIGHT CONDITIONS AND VEHICLE INCLUDING THE SAME

FIELD

The subject matter herein generally relates to road safety, and more particularly to a rearview mirror system and a vehicle including the rearview mirror system.

BACKGROUND

Rearview mirrors of a vehicle can be disposed on the left and right sides of a vehicle head to show road conditions at the side and rear of the vehicle, which provides better safety for a driver. When ambient light is insufficient, for example at night, the light reflected by external objects to the rearview mirror is very dim, which makes for an indecipherable or unhelpful image in the rearview mirror, so that it is difficult for the driver to determine the road and the situation of obstacles or dangers around the vehicle, putting the safety of driving at risk.

BRIEF DESCRIPTION OF THE DRAWINGS

Implementations of the present technology will now be described, by way of embodiment, with reference to the attached figures.

DETAILED DESCRIPTION

Figure 1:
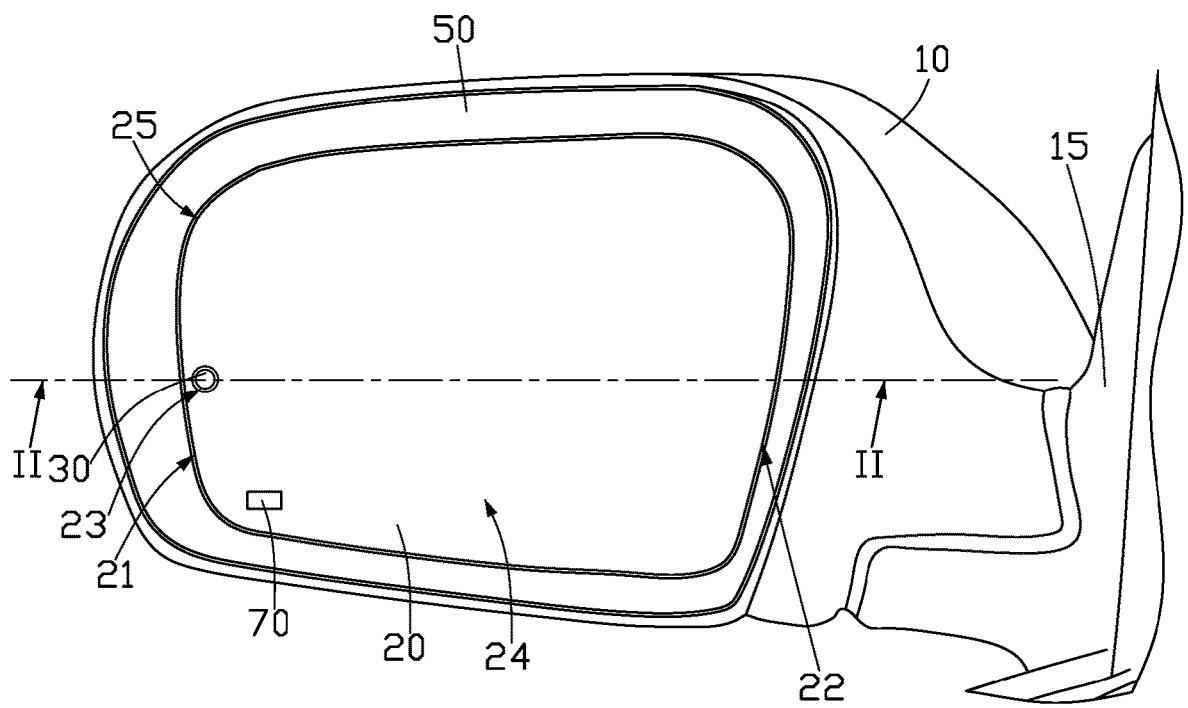
FIG. 1 is a schematic diagram of a rearview mirror system according to an embodiment of the present disclosure.

The present disclosure will now be described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these exemplary embodiments are provided so that this disclosure will be thorough and complete, and will fully convey the scope of the disclosure to those skilled in the art. Like reference numerals refer to like elements throughout.

The terminology used herein is for the purpose of describing particular exemplary embodiments only and is not intended to be limiting of the disclosure. As used herein, when a first component is referred to as "fixed to" a second component, it is to indicate that the first component may be directly fixed to the second component or may be indirectly fixed to the second component via a third component between them. When a first component is referred to as "connecting" to a second component, it is to indicate that the first component may be directly connected to the second component or may be indirectly connected to the second component via a third component between them. When a first component is referred to as "disposed to" a second component, it is intended that the first component may be directly disposed to the second component or may be indirectly disposed to the second component via a third component between them.

Unless otherwise defined, all terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and are not to be interpreted in an idealized or overly formal sense unless expressly so defined herein.

Figure 2:
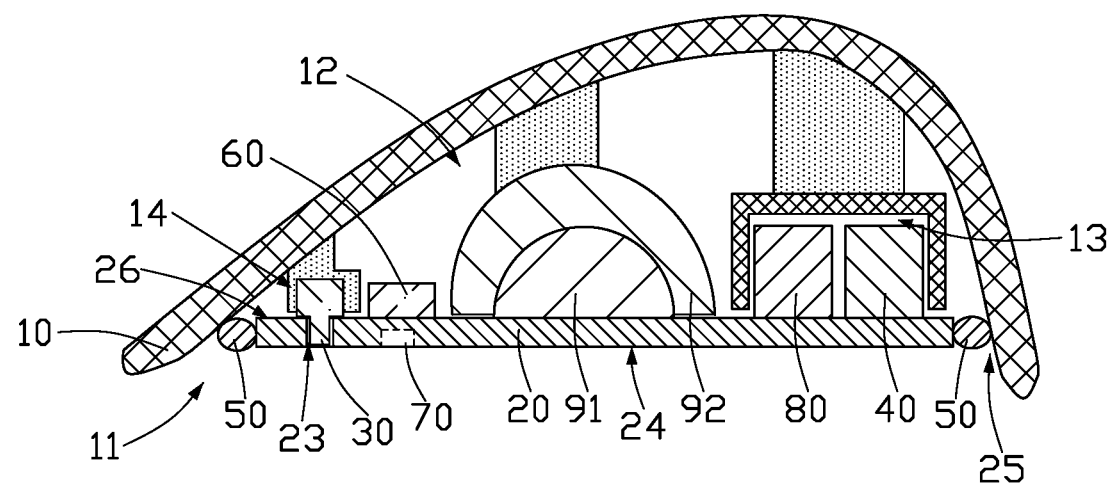
FIG. 2 is a cross-sectional view along line II-II of FIG. 1.
Figure 3:
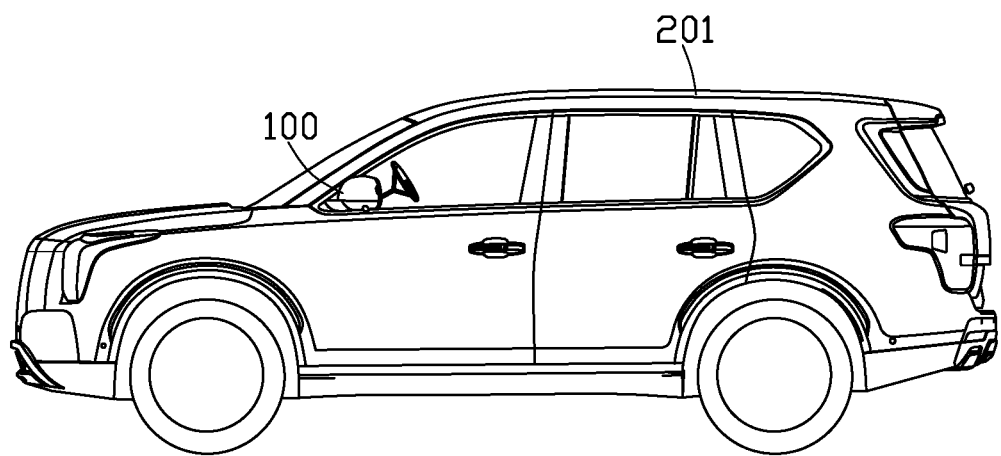
FIG. 3 is a schematic diagram of a vehicle according to an embodiment of the present disclosure.

Referring to FIGS. 1 to 3, an embodiment of a rearview mirror system 100 is provided. The rearview mirror system 100 is applied to a vehicle 200. The vehicle 200 includes a vehicle body 201. The rearview mirror system 100 includes a housing 10, a display screen 20 which is light-pervious at only one side, a camera 30, an image processing chip 40, a fill light lamp 50, a brightness sensor 70, and a controller 60. The housing 10 defines an opening 11. The display screen 20 is arranged at the opening 11. The display screen 20 covers the opening 11 to form a receiving chamber 12 with the housing 10. The camera 30 is arranged on the display screen 20. The camera 30 may also be arranged on an edge of a side of the housing 10 with the opening 11. The display screen 20 includes a back face 26 which is close to an inner wall of the housing 10 and faces the receiving chamber 12. The image processing chip 40 and the controller 60 are both arranged in the receiving chamber 12 and are fixed on the back face 26. The camera 30 and the fill light lamp 50 are both electrically connected with the controller 60.

In one embodiment, the display screen 20 defines a through hole 23. The camera 30 is partially accommodated in the through hole 23. With this arrangement, the camera 30 takes up less internal space of the housing 10. The camera 30 is configured to capture images of an object in front of the camera 30, that is, images of the sides and of what is behind the vehicle 200, and generate an optical signal. The fill light lamp 50 is arranged at the opening 11 of the housing 10 and is configured to provide a fill light to the camera 30. The image processing chip 40 is electrically connected with the display screen 20. The image processing chip 40 is configured to generate an image based on the optical signal, the image is displayed on the display screen 20.

If there is sufficient light, for example during a bright day, the display screen 20 has a plane reflection function the same as a plane mirror. In this case, the display screen 20 is used as a mirror to show a direct reflection. If there is insufficient light, the optical signal generated by the camera 30 is transmitted to the image processing chip 40, and the image processing chip 40 drives the display screen 20 to display the image. The rearview mirror system 100 can capture images of the object around the vehicle body 201 even if the ambient light is dim, so that the driver can easily determine the road conditions around the vehicle body 201, improving the safety of driving.

In some embodiments, the rearview mirror system 100 further includes a mounting portion 15. The mounting portion 15 connects the housing 10 to the vehicle body 201 and is configured for mounting the rearview mirror system 100 on the vehicle body 201. In some embodiments, the housing 10, the mounting portion 15, and the vehicle body 201 are integrally formed. The display screen 20 includes a first end 21 and a second end 22 opposite to the first end 21, the second end 22 is close to the mounting portion 15, and the through hole 23 is arranged close to the first end 21. With this arrangement, the field of view of the camera 30 is increased.

In some embodiments, the image processing chip 40 may be fixedly connected to the display screen 20 by a snap fitting or an adhesive.

In some embodiments, the brightness sensor 70 may be disposed at any location of the display screen 20 or the housing 10, the brightness sensor 70 is configured to measure an ambient brightness around the rearview mirror system 100. In other embodiments, the brightness sensor 70 may be disposed at other locations of the vehicle body 201. In one embodiment, the brightness sensor 70 is embedded on the display screen 20 and is located below the camera 30.

The display screen 20 is spaced from the inner wall of the housing 10 to form a gap 25 therebetween. In one embodiment, the gap 25 is arranged around a periphery of the display screen 20. The fill light lamp 50 is arranged in the gap 25. Opposite sides of the fill light lamp 50 may be embedded into the inner wall of the housing 10 and the display screen 20. The fill light lamp 50 may also be bonded to the housing 10 and the display screen 20 by glue. In some embodiments, the fill light lamp 50 may be a strip-shaped infrared LED When the ambient brightness measured by the brightness sensor 70 is below a preset brightness value, the controller 60 controls the camera 30 and the fill light lamp 50 to work. The camera 30 captures images about the road conditions beside the vehicle body 201 and generates an optical signal. The image processing chip 40 generates an image based on the optical signal, and drives the display screen 20 to display the image. In this case, the driver can view the road conditions around the vehicle body 201 through the image displayed on the display screen 20.

When the ambient brightness measured by the brightness sensor 70 is above or equal to the preset brightness value, the camera 30 and the fill light lamp 50 are not made to work, the display screen 20 is used as a mirror to show direct reflection of the road conditions around the vehicle body 201. In this case, the driver can directly view the road conditions around the vehicle body 201 through the display screen 20.

The rearview mirror system 100 further includes a power supply conversion module 80. The power supply conversion module 80 is arranged in the receiving chamber 12. The display screen 20, the camera 30, and the fill light lamp 50 are electrically connected with the power supply conversion module 80. The power supply conversion module 80 is configured to supply power to the display screen 20, the camera 30, and the fill light lamp 50.

In some embodiments, the image processing chip 40 and the power supply conversion module 80 are both fixed on the back face 26 of the display screen 20. A first mounting chamber 13 and a second mounting chamber 14 spaced from each other are arranged between the housing 10 and the display screen 20. The image processing chip 40 and the power supply conversion module 80 are accommodated in the first mounting chamber 13. The camera 30 is partially embedded in the second mounting chamber 14, and the other part of the camera 30 extends into the through hole 23.

In some embodiments, the rearview mirror system 100 further includes a first magnet 91 and a second magnet 92 corresponding to the first magnet 91. The first magnet 91 is fixed on the back face 26 of the display screen 20 and is spaced from the image processing chip 40 and the power supply conversion module 80. In one embodiment, the first magnet 91 is arranged in the middle of the display screen 20, which improves the stability of the display screen 20 at the opening 11 of the housing 10. The second magnet 92 is fixed on the inner wall of the housing 10 and is attracted to the first magnet 91, so that the display screen 20 is fixed to the housing 10.

In some embodiments, a surface of the first magnet 91 facing the second magnet 92 is arced. In one embodiment, the surface of the first magnet 91 facing the second magnet 92 is a convex spherical surface towards the second magnet 92. The second magnet 92 includes a concave surface facing towards the first magnet 91. The surface of the concavity corresponds to the convex spherical surface, so that a contact area between the first magnet 91 and the second magnet 92 is increased, improving the stability of the connection between the first magnet 91 and the second magnet 92.

In some embodiments, in order to protect the display screen 20, a protective film 24 is arranged on a surface of the display screen 20. In one embodiment, the protective film 24 is coated on a surface of the display screen 20 away from the housing 10.

Referring to FIG. 3, the vehicle 200 includes two rearview mirror systems 100 which are arranged on opposite sides of the vehicle body 201 and are connected with the vehicle body 201 through two housings 10.

The brightness sensor 70 is configured to measure the ambient brightness and transmit the ambient brightness value to the controller 60. When the ambient brightness measured by the brightness sensor 70 is below the preset brightness value, the controller 60 activates the camera 30 and the fill light lamp 50. The fill light lamp 50 provides a fill light to the camera 30, the camera 30 captures images of the object in front of the camera 30 and generates an optical signal, and the image processing chip 40 generates an image based on the optical signal and drives the display screen 20 to display the image. The display screen 20 thus displays clear images of the road conditions around the vehicle body 201 even in very dim light, improving the safety of driving.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A rearview mirror system applied to a vehicle, the vehicle comprising a vehicle body, the rearview mirror system comprising:
   a housing defining an opening;
   a display screen arranged at the opening, wherein the display screen is light-pervious at only one side;
   a camera disposed on the housing;
   an image processing chip arranged between the housing and the display screen and electrically connected with the display screen;
   a fill light lamp arranged on the housing and configured to provide a fill light to the camera; and
   a controller arranged between the housing and the display screen, wherein the camera and the fill light lamp are electrically connected with the controller,
   when ambient brightness around the vehicle is below a preset brightness value, the controller controls the fill light lamp and the camera to work, the camera is configured to capture images of an object in front of the camera and generate an optical signal, the image processing chip is configured to generate an image based on the optical signal, and the display screen is configured to display the image, and
   when the ambient brightness is above or equal to the preset brightness value, the controller controls the fill light lamp and the camera to stop working, and the display screen is configured to directly reflect the object.

2. The rearview mirror system of claim 1, wherein the housing is spaced from the display screen to form a gap therebetween, the fill light lamp is arranged in the gap.

3. The rearview mirror system of claim 2, wherein the gap is arranged around a periphery of the display screen.

4. The rearview mirror system of claim 1, wherein the display screen defines a through hole, a part of the camera is accommodated in the through hole.

5. The rearview mirror system of claim 4, further comprising a mounting portion connecting the housing to the vehicle body, wherein the display screen includes a first end and a second end opposite to the first end, the second end is close to the mounting portion, the through hole is close to the first end.

6. The rearview mirror system of claim 4, wherein a first mounting chamber and a second mounting chamber are arranged between the housing and the display screen, the first mounting chamber is spaced from the second mounting chamber, the image processing chip is accommodated in the first mounting chamber, and the other part of the camera is accommodated in the second mounting chamber.

7. The rearview mirror system of claim 1, wherein the fill light lamp is an infrared LED.

8. The rearview mirror system of claim 1, further comprising a brightness sensor for measuring the ambient brightness around the vehicle, wherein the brightness sensor is arranged on the housing and is electrically connected with the controller.

9. The rearview mirror system of claim 1, further comprising a protective film arranged on a surface of the display screen away from the housing.

10. The rearview mirror system of claim 1, further comprising a first magnet and a second magnet attracted to the first magnet, wherein the first magnet is fixed on a surface of the display screen facing the housing, and the second magnet is fixed on an inner wall of the housing.

11. A vehicle comprising:
a vehicle body; and
a rearview mirror system comprising:
a housing connected with the vehicle body and defining an opening;
a display screen arranged at the opening, wherein the display screen is light-pervious at only one side;
a camera disposed on the housing;
an image processing chip arranged between the housing and the display screen and electrically connected with the display screen;
a fill light lamp arranged on the housing and configured to provide a fill light to the camera; and
a controller arranged between the housing and the display screen, wherein the camera and the fill light lamp are electrically connected with the controller,
when ambient brightness around the vehicle is below a preset brightness value, the controller controls the fill light lamp and the camera to work, the camera is configured to capture images of an object in front of the camera and generate an optical signal, the image processing chip is configured to generate an image based on the optical signal, and the display screen is configured to display the image, and
when the ambient brightness is above or equal to the preset brightness value, the controller controls the fill light lamp and the camera to stop working, and the display screen is configured to directly reflect the object.

12. The vehicle of claim 11, wherein the housing is spaced from the display screen to form a gap therebetween, the fill light lamp is arranged in the gap.

13. The vehicle of claim 12, wherein the gap is arranged around a periphery of the display screen.

14. The vehicle of claim 11, wherein the display screen defines a through hole, a part of the camera is accommodated in the through hole.

15. The vehicle of claim 14, wherein the rearview mirror system further comprises a mounting portion connecting the housing to the vehicle body, the display screen includes a first end and a second end opposite to the first end, the second end is close to the mounting portion, the through hole is close to the first end.

16. The vehicle of claim 14, wherein a first mounting chamber and a second mounting chamber are arranged between the housing and the display screen, the first mounting chamber is spaced from the second mounting chamber, the image processing chip is accommodated in the first mounting chamber, and the other part of the camera is accommodated in the second mounting chamber.

17. The vehicle of claim 11, wherein the fill light lamp is an infrared LED.

18. The vehicle of claim 11, wherein the rearview mirror system further comprises a brightness sensor for measuring the ambient brightness around the vehicle, the brightness sensor is arranged on the housing and is electrically connected with the controller.

19. The vehicle of claim 11, wherein the rearview mirror system further comprises a protective film arranged on a surface of the display screen away from the housing.

20. The vehicle of claim 11, wherein the rearview mirror system further comprises a first magnet and a second magnet attracted to the first magnet, the first magnet is fixed on a surface of the display screen facing the housing, and the second magnet is fixed on an inner wall of the housing.

* * * * *